Jan. 26, 1960   B. N. WALLIS   2,922,601
VARIABLE SWEEPBACK AEROPLANE
Filed June 5, 1956   2 Sheets-Sheet 1
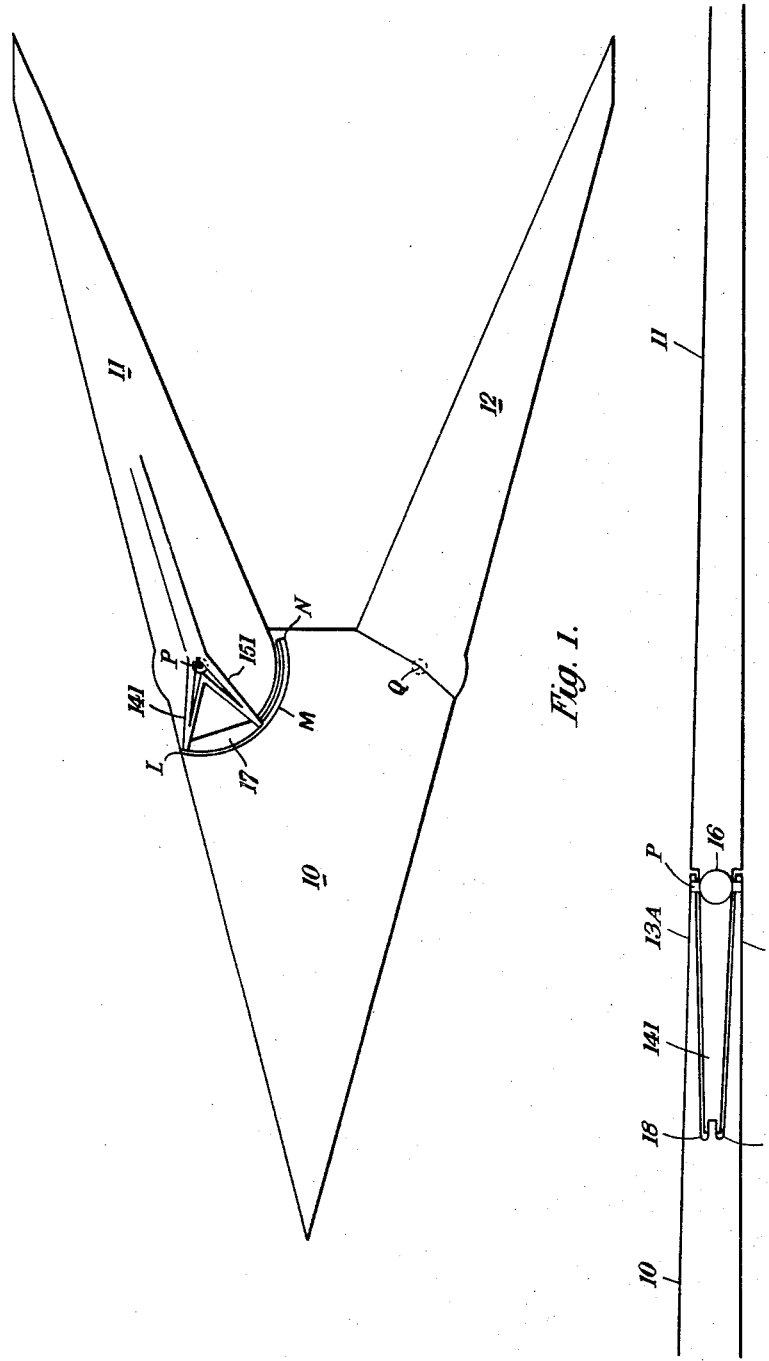

Jan. 26, 1960   B. N. WALLIS   2,922,601
VARIABLE SWEEPBACK AEROPLANE
Filed June 5, 1956   2 Sheets-Sheet 2
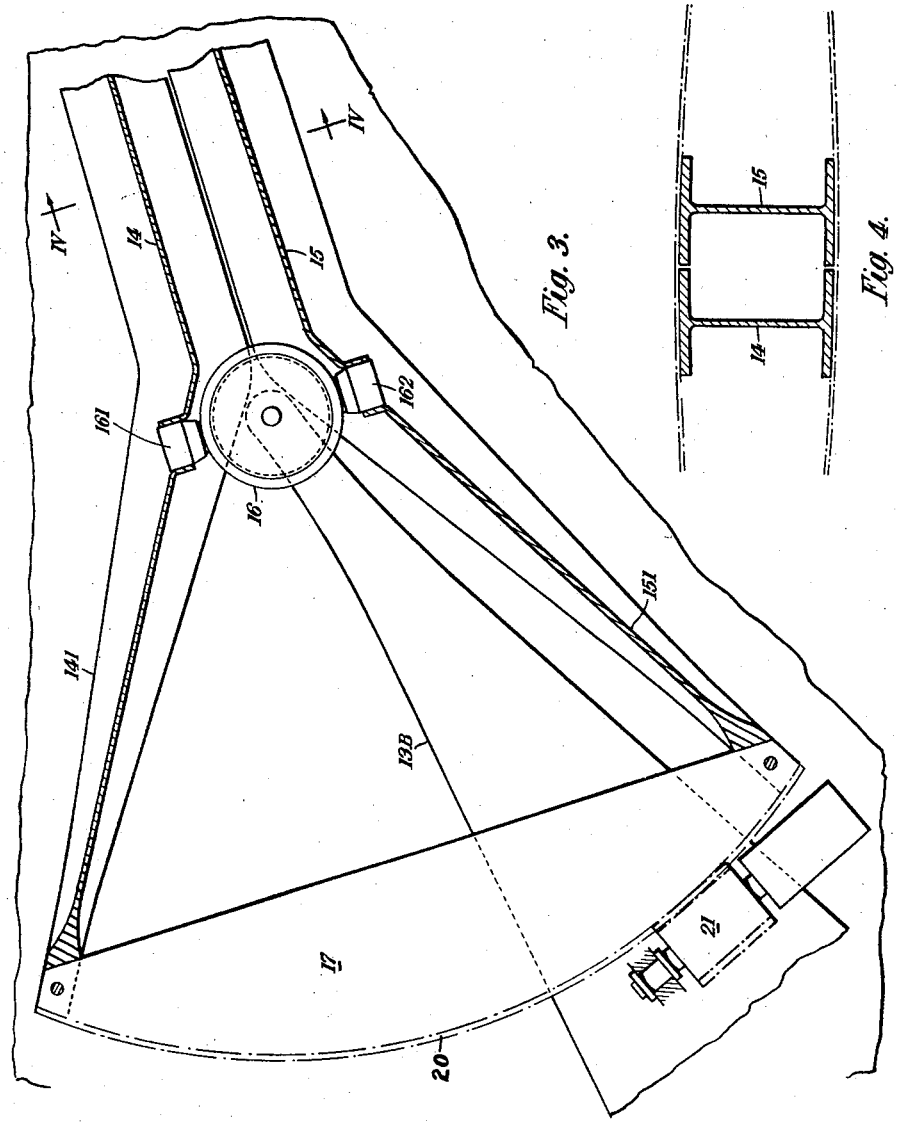

United States Patent Office 2,922,601
Patented Jan. 26, 1960

2,922,601

VARIABLE SWEEPBACK AEROPLANE

Barnes Neville Wallis, Effingham, England, assignor to Vickers-Armstrongs (Aircraft) Limited, London, England Application June 5, 1956, Serial No. 589,439

Claims priority, application Great Britain June 6, 1955

10 Claims. (Cl. 244—46)

The invention is concerned with that type of aeroplane in which the wings are pivotally connected to the body to permit their movement in sweep during flight, e.g. as described in United States patent application Serial No. 482,429 filed January 17, 1955. In such aeroplanes it is necessary to employ a wing structure and mounting which will afford not only (a) provision for pivotal movements to be imparted to the wing in flight, but also (b) a high degree of resistance to bending and torsion, with (c) accommodation of the change of slope of the spar at the pivot bearing under bending and torsional loads, and (d) the efficient transmission of wing drag loads to the body. The conditions (c) and (d) may be met by use of the wing pivot bearing described in my co-pending United States patent application Serial No. 580,130 filed April 23, 1956, in which the relatively pivotable elements are free to rotate in any direction about the centre of the bearing without interfering with its operation, the wing drag load being transmitted to the body through the equatorial bearing surfaces. The present invention has for its object to provide improved means whereby conditions (a) and (b) may be satisfied.

According to the invention, the spar of each wing takes the form of a double cantilever the inboard portion of which is bifurcated to form divergent limbs lying substantially in the plane of sweep, means being applied to the ends of said limbs for driving them along an arc struck from the wing pivot axis as required to execute wing movements in sweep. Means may be provided in the body for constraint of the spar limbs against displacement under flexural and torsional loads.

The tapering ends of the limbs are made as long in relation to the outboard portion as can be accommodated conveniently within the body, and they are preferably connected at their extremities by a chordal member, which together with said limbs form a substantially tetrahedral structure of great stiffness.

Adjustments of the wing in sweep may be effected by means of a motor-driven worm, mounted on the body structure and meshing with a worm-wheel segment which is incorporated in the aforesaid chordal member of the wing spar structure, the ends of the limbs being thereby driven along an arc struck from the wing pivot axis.

The said tetrahedral structure is housed in a cavity in the body, said cavity containing tracks arranged to constrain the ends of the limbs to move only in the plane of sweep of the chordal member. The outer or vertical "edge" of the tetrahedron, corresponding to the vertical depth of the web of the spar, lies at or near the wing pivot axis and is parallel thereto, i.e. normal to the said plane of sweep. Other constructional details of the wing spar structure will be apparent from the following description.

One embodiment of the invention is illustrated in, and is hereinafter described with reference to the accompanying diagrammatic drawings, of which Fig. 1 is a partly sectional plan of an aerodyne having pivotally mounted wings in accordance with my said co-pending United States patent application Serial No. 482,249, and Fig. 2 is a longitudinal section of a part thereof, drawn to a larger scale. Fig. 3 is an enlarged plan of the wing structure in the region of the pivot, and Fig. 4 is a section on the line IV—IV of Fig. 3.

The aerodyne shown in the drawing comprises a fore-wing 10 of delta plan-formation, and two main wings 11 and 12 which extend from the ends of the base, where they are pivoted to the fore-wing structure for movement in sweep about bearings 16 the axes whereof are indicated at P and Q. The said bearings are constructed in accordance with the invention which forms the subject of my said co-pending United States patent application No. 580,130, the upper and lower spigot members of the convex spherical component of each such bearing being secured to brackets mounted in the spaced arms 13A, 13B of a bifurcated beam structure incorporated in the fore-wing frame.

The spar of each main-wing is composed of a flanged box-section member, seen in cross-section in Fig. 4, which comprises two I-section beams 14, 15 secured together side by side, their webs extending upright substantially throughout the outboard portion of the wing and tapering towards the main wing-tip. The trunnions 161, 162 of the concave spherical component of the pivot bearing are rotatably mounted in the webs of the beams 14, 15 which here diverge to form separate inwardly extending tapered limbs 141, 151. The extremities of said limbs are connected by a chordal member 17, the outer edge of which conforms to an arc (indicated at LMN in Fig. 1) struck about the axis P of the bearing 16, and it will be seen that the said limbs 141, 151 combine with the chordal member 17 to form a substantially tetrahedral structure which possesses a high degree of stiffness.

The inboard part of the main-wing, bounded by the limbs 141, 151 and the member 17, is housed within a cavity in the fore-wing between the spaced arms 13A, 13B of the fore-wing structure, and arcuate tracks 18, 19 are provided along the inner marginal boundary of said cavity to guide the ends of the limbs 141, 151, constraining the latter to move in the plane of sweep, and affording support against displacement under flexural and torsional loads upon the main-wing.

The outer edge of the chordal member 17 is furnished with a worm-wheel gear segment 20, and a motor-driven worm 21 meshing therewith affords means for adjusting the main-wing in sweep.

What I claim as my invention and desire to secure by Letters Patent is:

1. An aeroplane having a fore-wing and main-wings pivotally connected to the fore-wing at the rear thereof, the spar of each main-wing having the form of a double cantilever the inboard portion whereof is bifurcated to form divergent limbs lying substantially in the plane of sweep, and means connected to the ends of said limbs for driving them along an arc struck from the wing pivot axis as required to execute wing movements in sweep.

2. An aeroplane as claimed in claim 1, wherein the fore-wing incorporates means for constraint of the spar limbs against displacement under flexural and torsional loads.

3. An aeroplane as claimed in claim 1, wherein the inboard limbs of the spar are connected by a chordal member which together with said limbs forms a substantially tetrahedral structure an outer edge of which lies at or near to the axis of the main-wing pivot and is parallel thereto.

4. An aeroplane as claimed in claim 3, wherein the tetrahedral structure is housed in a fore-wing cavity containing tracks arranged to constrain the ends of the limbs to move only in the plane of sweep of the chordal member.

5. An aeroplane as claimed in claim 1, wherein each wing spar is a box-section member comprising two I-section beams secured together side by side, their webs extending upright substantially throughout the outboard portions of the spar and tapering towards the wing-tip.

6. An aeroplane as claimed in claim 5, wherein the wing pivot bearing is enclosed in the fork between the spar limbs, the divergent parts of which taper towards their extremities where they are connected by the said chordal member, the outer edge of which member conforms to an arc struck about the pivot axis.

7. An aeroplane as claimed in claim 3, wherein the chordal member connecting the ends of the spar limbs is geared to mechanism for imparting pivotal movement to the main-wing.

8. An aeroplane comprising a Delta-shaped fore-wing, two main-wings respectively extending from the ends of the base of the fore-wing, means for pivotally connecting each main-wing to the fore-wing for movement from an outstpear position to a fully swept back position, each main-wing having a spar in the form of a double cantilever the inboard portion of which is bifurcated to form divergent limbs lying substantially in the plane of sweep, and means connected to the ends of said limbs for driving them along an arc struck from the wing-pivot axis to execute wing movements in sweep.

9. An aeroplane, as claimed in claim 8, wherein the inboard limbs of the spar are connected by a chordal member which, together with said limbs, forms a substantially tetrahedral structure and outer edge of which lies near the axis of the pivot and is parallel thereto.

10. An aeroplane, as claimed in claim 9, wherein the tetrahedral structure is housed in a cavity of the fore-wing and tracks are arranged in said cavity to constrain the ends of the limbs to move only in the plane of sweep of the chordal member.

References Cited in the file of this patent
UNITED STATES PATENTS

| | | |
|---|---|---|
| 1,740,016 | Hubschman | Dec. 17, 1929 |
| 2,683,574 | Peterson | July 13, 1954 |
| 2,699,300 | Trotter et al. | Jan. 11, 1955 |